United States Patent [19]

Taylor

[11] Patent Number: 5,091,036
[45] Date of Patent: Feb. 25, 1992

[54] APPARATUS FOR PULTRUDING THERMOPLASTIC STRUCTURES AT BELOW MELT TEMPERATURES

[76] Inventor: Scott R. Taylor, 516 Kaw, Bartlesville, Okla. 74003

[21] Appl. No.: 417,297

[22] Filed: Oct. 5, 1989

[51] Int. Cl.⁵ .......................... B32B 1/00; B32B 1/08; B32B 31/22
[52] U.S. Cl. .................................. 156/379.6; 156/180; 156/182; 156/358; 156/441; 156/73.2; 156/272.2; 156/580.1; 264/23; 264/136; 425/114; 425/115; 425/308; 425/501; 425/505; 425/508; 425/174.2
[58] Field of Search .................... 264/22, 23, 25, 108, 264/134, 135, 136, 137, 257; 156/73.1, 73.2, 166, 180, 182, 187, 189, 272.2, 353, 358, 379.6, 441, 380.1, 380.2, 580.1, 580.2; 425/114, 115, 174.2, 308, 501, 505, 508

[56] References Cited

U.S. PATENT DOCUMENTS

| | | | |
|---|---|---|---|
| 2,571,717 | 10/1951 | Howald | 156/166 |
| 2,871,911 | 2/1959 | Goldsworthy | 156/441 |
| 3,244,570 | 4/1966 | Boggs | 156/178 |
| 3,284,852 | 11/1966 | Boggs | 156/441 |
| 3,556,888 | 1/1971 | Goldsworthy | 156/180 |
| 3,684,622 | 8/1972 | Goldsworthy | 156/441 |
| 3,769,127 | 10/1973 | Goldsworthy | 156/180 |
| 3,895,896 | 7/1975 | White | 425/112 |
| 4,414,045 | 11/1983 | Wang | 264/23 |
| 4,462,946 | 7/1984 | Goldsworthy | 156/441 |
| 4,489,129 | 12/1984 | Shue et al. | 428/366 |
| 4,529,473 | 7/1985 | Mims | 264/23 |
| 4,549,920 | 10/1985 | Cogswell | 156/441 |
| 4,559,262 | 12/1985 | Cogswell | 156/166 |
| 4,680,224 | 7/1987 | O'Connor | 428/294 |
| 4,767,492 | 8/1988 | Fukusima | 264/23 |
| 4,859,378 | 8/1989 | Wolcott | 264/23 |
| 4,902,451 | 2/1990 | Inoue | 264/23 |

Primary Examiner—Jay H. Woo
Assistant Examiner—Jeremiah F. Durkin, II
Attorney, Agent, or Firm—Head & Johnson

[57] ABSTRACT

Apparatus for pultruding thermoplastic, resin-impregnated, fibrous substructures heats the substructures to a temperature just below the melting temperature of the resin. The heated substructures are then simultaneously pulled through a passage to conform them to a desired cross section. At least a portion of the perimeter of this passage is formed by a wave guide. The wave guide is vibrated at ultrasonic frequency in a predetermined direction so as to direct the ultrasonic vibration into the substructures within the passage. The application of the ultrasonic vibration stimulates the flow of the resin in the heated substructures. Pressure is applied to the flowing substructures within the passage to consolidate them into an integral structure conforming to the chosen profile. The ultrasonic vibration at low power input does result in some heat transfer to the profile, but the flow rates of the resin exemplify an increase in flow far greater than expected in relation to the temperature increase. The result of the application of ultrasonic vibration to the resin impregnated fibers in their unmelted state is a pultrusion process which can comfortably operate at pull rates considerably better than other processes while producing a highly uniform product.

11 Claims, 3 Drawing Sheets

APPARATUS FOR PULTRUDING THERMOPLASTIC STRUCTURES AT BELOW MELT TEMPERATURES

BACKGROUND OF THE INVENTION

This invention relates generally to methods and apparata for manufacturing thermoplastic structures and more particularly concerns the use of ultrasonic vibrations to induce flow of resin in resin impregnated fiber substructures at temperatures below the melt temperature of the resin.

Pultrusion has proven to be a very effective process in the manufacture of thermoset structures. Typically, the process employs a thermoset resin in its liquid state in a bath in which the reinforcing fibers are coated and impregnated. The impregnated fibers are pulled through dies to shape the structure and heated to cure the thermoset resin to a hard, solid matrix.

Attempts to apply the pultrusion process to thermoplastic resins have met with considerable difficulty. When heated above the melting point, the high viscosity of a thermoplastic resin makes complete impregnation of the reinforcing fibers very difficult. Inconsistent impregnation means inconsistent finished products. Furthermore, this high viscosity also results in exertion of very high pull forces on the resin coated fibers. The high pull forces in turn cause a relatively high frequency of breakage of the fiber chain during the pultrusion process. This translates into costly work interruptions. These problems are exacerbated when the pultrusion process is used in the production of profiles such as T sections, channels, angles, tubular members or other more complex cross sectional shapes.

In order to mitigate these difficulties, the present thermoplastic pultrusion processes compromise efficiency. Most notably, the pull rate of present systems is generally limited to two to three inches of product profile per minute. Maximum pull rates are achieved only in specific applications depending on the choice of resin and profile configuration and still approximate only two feet per minute. This is far below the pull rates achieved in the pultrusion of thermoset profiles.

This comparative inefficiency of the thermoplastic pultrusion process is unacceptable because thermoplastic structures offer tremendous advantages over thermoset structures. For example, thermoplastic structures, unlike thermosets, require no curing, thus simplifying processing and affording essentially infinite storage life.

Among the present solutions offered for the difficulty is the use of extended melt time to permit a more thorough impregnation of the fibers. While this affords a more consistent finished product, it obviously decreases the production rate of the system. Another alternative is the use of polymers having lower melt viscosities. While this is appropriate for many applications, it is an unfortunate concession to undesirable limitations. Other solutions utilize ultrasonic vibration at high power input to increase the melt rate of the resin, to increase the temperature of the melted resin or to overcome the frictional forces impeding the pull of a profile which has been heated above melt temperature. These solutions are bandaids which cover the problems of high viscosity of melted thermoplastic resins rather than cure them.

It is therefore an object of this invention to increase the efficiency of the pultrusion process as applied to thermoplastic resins. It is a further object of this invention to reduce the pull forces on thermoplastic profiles which cause their breakage and consequential interruptions of the manufacturing process. It is, therefore, an object of this invention to permit the pultrusion of thermoplastic profiles at temperatures below the melt temperature of the resin. Some collateral objects of this invention are to enable use of a wider selection of thermoplastic resins, to minimize the risk of degradation of thermoplastic polymers including those of higher molecular weights, to provide a more uniform thermoplastic profile having minimal porosity and voids in its final structure, to reduce the warpage that ordinarily occurs during cooling of a molten thermoplastic polymer, to reduce the sensitivity of the system to variations in temperature which would result in defects in the finished product and to reduce wear and damage to the pultrusion process equipment.

SUMMARY OF THE INVENTION

In accordance with the invention, a method and apparatus are provided for pultruding thermoplastic structures from resin impregnated fiber substructures at a temperature below the melt temperature of the thermoplastic resin. It has been found that the application of ultrasonic vibration to a below-melt-temperature thermoplastic profile at its point of consolidation will cause the resin in the vibrated structure to flow. While the ultrasonic vibration at low power input does result in some heat transfer to the profile, the flow rates of the resin exemplify an increase in flow far greater than expected in relation to the temperature increase. The result of the application of ultrasonic vibration to the resin impregnated fibers in their unmelted state is a pultrusion process which comfortably operates at a pull rate of five to six feet per minute while producing a highly uniform product.

In the general thermoplastic pultrusion process of the present invention, the resin-impregnated, fibrous substructures are heated to a temperature just below the melting temperature of the resin. The heated substructures are then simultaneously pulled through a passage to conform them to the desired cross section. At least a portion of the perimeter of this passage is formed by a wave guide. The wave guide is vibrated at ultrasonic frequency in a predetermined direction so as to direct the ultrasonic vibration into the substructures within the passage. The application of the ultrasonic vibration stimulates the flow of the resin in the heated substructures. Pressure is applied to the flowing substructures within the passage to consolidate them into an integral structure conforming to the chosen profile.

In one specific embodiment of the invention, the passage consists of an aperture through the wave guide with the axis of the aperture aligned so that the vibration of the wave guide will be normal to the axis of the aperture. In another specific embodiment the axis of the aperture is aligned in the wave guide such that the vibration of the wave guide will be parallel to the axis. In another specific embodiment of the invention, the passage is defined by a platen, the end of a wave guide spaced from the platen and members fixed to the platen and extending to the wave guide.

In those embodiments employing an aperture through a wave guide, the aperture preferably constrictingly tapers to its outlet, thereby providing the necessary pressure to consolidate the flowing substructures into an integral structure. In the embodiment employing the platen, the wave guide is biased inwardly into the passage to provide the pressure necessary to consolidate the flowing substructures into an integral structure.

All of the above embodiments may further be modified to include a mandrel of preselected cross section which is axially disposed within the aperture or passage to produce a tubular structure having exterior and interior walls of preselected cross section. The mandrel may also be vibrated to facilitate pulling of the substructures.

All of these embodiments and modifications can further be varied by one or more additional steps. For example, the platen or the wave guide or both may be heated to a temperature equal to or just below the temperature to which the resin impregnated fiber substructures have been heated. Special provision may be made for cooling the integral structure as it exits the aperture or passage. Further pressing of the structure may be employed to maximize consolidation of the substructures. And, of course, the finished products may be cut into desirable lengths.

The selected ultrasonic frequency should be in the range of ten to one hundred kHz and preferably in the range of fifteen to fifty kHz. The input power should be in the range of twenty-five to five hundred watts and preferably in the range of fifty to three hundred watts. The actual power input is determinable as a function of the contact area of the wave guide with the substructures.

The preferred substructures for use in the process are strips of resin-impregnated fiber tape or pultruded laminates of resin-impregnated fiber.

BRIEF DESCRIPTION OF THE DRAWING

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
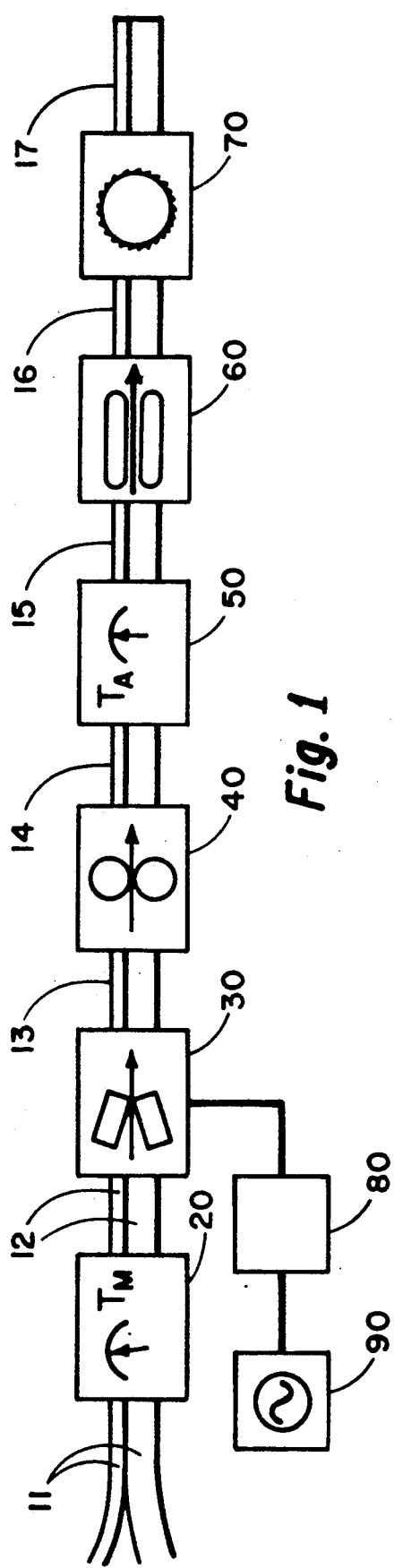
FIG. 1 is a block diagram illustrating the below-melt-temperature, ultrasonically induced, pultrusion process for producing thermoplastic structures.

FIG. 1 is a block diagram of a typical process in accordance with the invention for pultruding resin impregnated fiber substructures into a thermoplastic structure of predetermined cross section.

The substructures 11 are first fed under tension into a preheat section 20 where they are heated to a temperature just below the melt temperature of the thermoplastic resin impregnated in the substructures 11. Preferably, the maximum temperature attained by the preheated substructures will be approximately 25° F. below the resin melt temperature. This may vary depending upon the specific melt temperature of the selected resin and the desired pull rate of the overall process. For example, at faster pull rates, transient temperature changes would have less of an impact on the process and, therefore, the preheat temperature could be closer to the melt temperature.

The preheated substructures 12 are pulled from the preheat section 20 into an ultrasonically activated wave guide section 30. In the wave guide section 30, the heated substructures 12 are shaped to the desired cross-sectional configuration, vibrated at ultrasonic frequencies to stimulate the below-melt-temperature resins to flow and pressed to consolidate the substructures in which resin flow has been induced into an integral structure 13 which exits the wave guide section 30.

If further consolidation is required, the integral structure 13 may be fed through a roller section 40 where the structure 13 may be further pressed between rollers spring loaded or otherwise biased toward each other. Either the rolled structure 14 or, if the roller section 40 is not employed, the consolidated structure 13 may be fed into a cooling section 50 if cooling at a rate faster than possible at ambient temperatures is desirable.

The feeding of the substructure 11 into the preheat section 20 and thence through the entire pultrusion process is accomplished by any suitable means presently available in the art, such as by the belt puller 60. As the pulled structure 16 exits the belt puller 60 it may be fed through a cutting section 70 in which a traveling cut off saw or other appropriate cutting means can be used to cut the completed thermoplastic structure into predetermined lengths 17.

As shown in FIG. 1, the resin-impregnated fiber substructures 11 are pultruded laminates of rectangular or simple, curved cross-section. However, the substructures 11 may take other forms such as preimpregnated tape, commonly known as "Prepreg", dispensed under tension from creels (not shown) into the preheat section 20.

The principal difference between the above-described typical pultrusion process of the present invention and other such processes lies in the operation of the preheat section 20 and in the structure and operation of the wave guide section 30. In other presently known systems, the preheat section 20 would be used to heat the substructures to at least melt temperature and probably to a temperature significantly higher than the melt temperature of the resin in the substructures. In the wave guide section 30, other known systems incorporate only a shaping die and do not use ultrasonic vibration at all. In those systems that do use ultrasonic vibration, the vibrations are applied either to assure high enough transient temperatures above the resin melt temperature to cause flow or to vibrate various system elements to reduce friction between those elements and the above-melt-temperature resin flowing through or across them. In the present invention, the ultrasonic vibrations are not applied for these purposes, but rather to cause the resin in the substructures to flow at a temperature below the melt temperature of the resin.

Three different embodiments of the wave guide section 30 of the present inventin may be used depending upon the particular application or desired cross-sectional configuration of the thermoplastic structure. These embodiments include a platen configuration 230, illustrated in FIG. 2, a tapered normal configuration 330, illustrated in FIG. 3 and a tapered parallel configuration 430, illustrated in FIG. 4.

Figure 5:
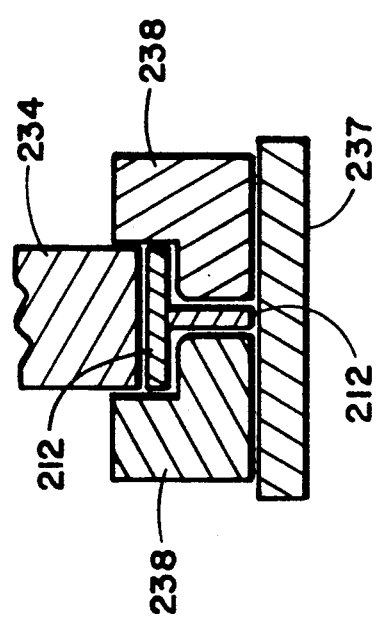
FIG. 5 is an end view illustrating the configuration of a wave guide passage for formation of a typical solid thermoplastic structure.
Figure 2:
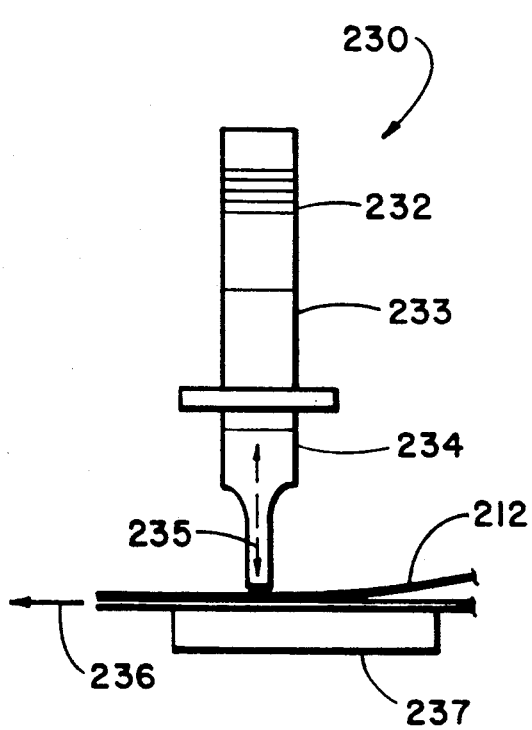
FIG. 2 is a diagrammatical representation of the platen embodiment of the wave guide section used in the pultrusion process.

The platen configuration 230, illustrated diagramatically in FIG. 2, includes a transducer or converter 232 which converts electrical energy into vibrational energy at an ultrasonic frequency. The transducer 232 is secured to a supporting framework (not shown) by means of a force insensitive mount 233 which isolates the ultrasonically vibrated equipment from the framework. The ultrasonic vibrations are transferred to a wave guide 234 set in a longitudinal mode of vibration with its vibrational axis 235 normal to the axis of the direction of movement of the substructures 212 between the end of the wave guide 234 and the top of the platen 237. In FIG. 5, the configuration of the passage through which the substructures 212 are pulled is shown. The passage is formed by the upper face of the platen 237, the lower face of the wave guide 234 and members 238 fixed to the platen 237 in any suitable manner (not shown) and extending from the platen 237 to the wave guides 234. The configuration of the members 238 is selected so that the interior walls of the passage formed by the wave guide 234, the platen 237 and the members 238 will have a cross section substantially the same as the desired configuration of the thermoplastic structure. The configuration of the members 238 is also such that the wave guide 234 is free to penetrate between them and into the passage. In this embodiment, pressure is applied to the substructures 212 within the passage through the force insensitive mount 233 hydraulically, or by any other suitable means, to cause the vibrating wave guide 234 to penetrate the passage and compress the substructures 212 within the passage walls.

In the operation of the platen embodiment, as the substructures 212 are pulled through the passage, the substructures 212 are constricted into the desired configuration by the platen 237, the members 238 and the wave guide 234. The ultrasonic vibration of the wave guide 234 is transmitted to the substructures 212 which are approximately 25° F. below the melting temperature of the thermoplastic resin in the substructures 212. A certain portion of the ultrasonic vibration will be absorbed by and converted to heat in the substructures 212, thus raising their temperature closer to their melt temperature. However, the ultrasonic vibration will cause the resin in the substructures 212 to flow before the resins reach their melt temperature. With the resins flowing, the pressure exerted on the substructures 212 by the wave guide 234 under hydraulic or other pressure, causes the flowing resin in the substructures 212 to consolidate, thereby resulting in the formation of an integral thermoplastic structure of the desired predetermined cross sectional configuration.

As shown in FIG. 5, the substructures 212 consist of pultruded laminates of rectangular configuration used to form an integral T-shaped structure. This illustration was chosen because the platen embodiment 230 of the wave guide section 30 is particularly suited to the formation of angle, T, channel and I-shaped structures as well as other structures where one joint is being formed between two precursor laminates.

Figure 3:
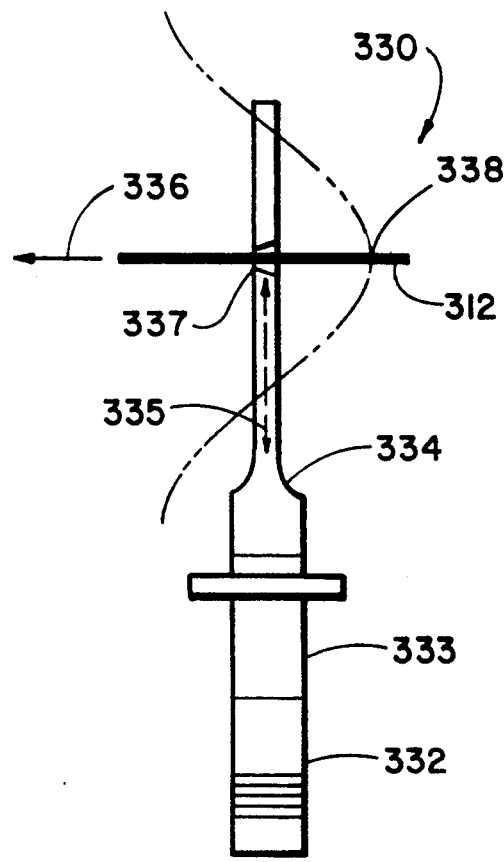
FIG. 3 is a diagrammatical representation of the tapered normal embodiment of the wave guide section used in the pultrusion process.

The tapered normal embodiment 330 of the wave guide section 30 is illustrated diagramatically in FIG. 3. The assembly of the transducer 332, the force insensitive mount 333 and the wave guide 334 are similar to the arrangement described in the preceding embodiment. However, the passage through which the substructures 312 are pulled consists of a tapered aperture 337 through the wave guide 334. In this embodiment, the wave guide 334 is again in the longitudinal mode of vibration in which it vibrates along an axis 335 normal to the axis 336 of the aperture 337 and in the direction of movement of the substructures 312 through the aperture 337. In this embodiment, the aperture 337 is positioned at an antinode 338 in the vibrational pattern of the wave guide 334. The outlet or narrow end of the tapered aperture 337 has a cross sectional configuration which is substantially the same as the predetermined cross-sectional configuration of the thermoplastic structure to be formed.

In the operation of this tapered normal embodiment, as the substructures 312 are fed into the larger inlet portion of the aperture 337, the application of pressure to the substructures is accomplished by the tapering of the aperture 337. The heated substructures 312 are fed into the aperture 337 where they are shaped into the desired configuration. The vibration of the wave guide 334 is applied to the substructures 312 in a direction normal to their movement through and along the axis of the aperture 337 but, unlike the previous embodiment in which the vibrations were applied to one side of the substructure arrangement only, the vibrations are applied to all of the exterior surfaces of the substructures 312 within the wave guide 334. As previously described, the ultrasonic vibration causes the resin in the substructures 312 to flow at a temperature below the melt temperature of the resins in the substructures 312. The constricting taper of the aperture 337 causes the flowing resins in the substructures 312 to be consolidated into the integral structure of predetermined cross section which exits from the outlet of the aperture 337. This embodiment is particularly useful in the formation of thermoplastic structures having curved cross-sections or formed from precursor laminates of a curved configuration.

Figure 4:
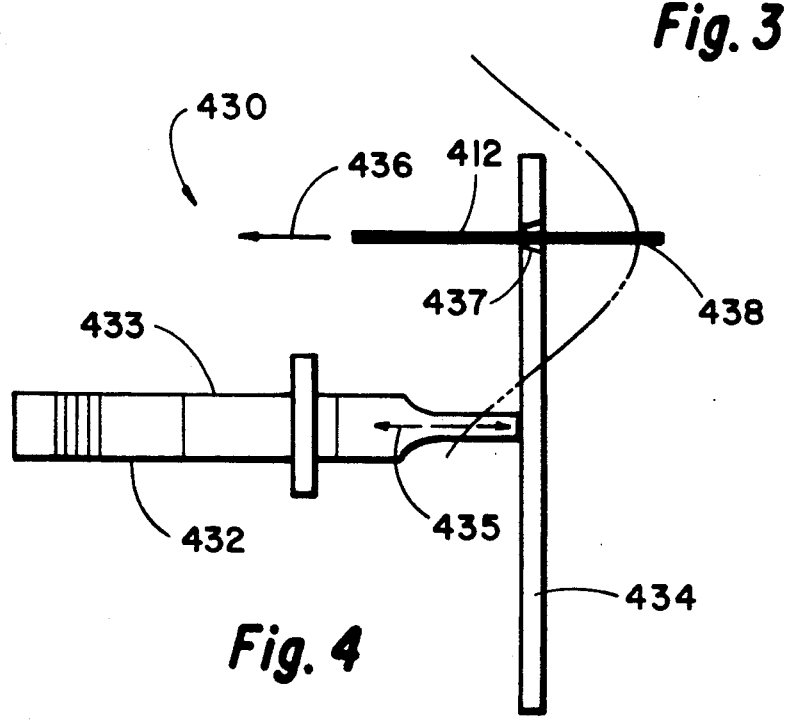
FIG. 4 is a diagrammatical representation of the tapered parallel embodiment of the wave guide section used in the pultrusion process.

FIG. 4 diagramatically illustrates the tapered parallel embodiment 430 of the wave guide section 30. The configuration of the transducer 432 and the force insensitive mount 433 is similar to that of the previous embodiments. However, the wave guide section 434 is set in a T configuration in order to achieve a flexural mode of vibration in which vibration of the wave guide 434 is along an axis 435 which is parallel to the direction of movement 436 of the substructures 412 through the aperture 437. As in the tapered normal embodiment, the aperture 437 of the tapered parallel embodiment 430 is positioned at an antinode 438 in the vibrational pattern of the wave guide 434. The configuration of the aperture 437 is again constrictingly tapered to an outlet passage having a cross-section substantially the same as the predetermined cross-section of the desired thermoplastic structure.

The operation of the tapered parallel embodiment 430 is in all respects similar to the operation of the tapered normal embodiment 330 except that the vibrations are applied to the substructures 412 in a direction parallel to the direction of movement of the substructures 412 through the aperture 437. This embodiment 430 is particularly suited to applications in which it is especially desirable to reduce friction between the tapered aperture 437 and the substructures 412.

Figure 6:
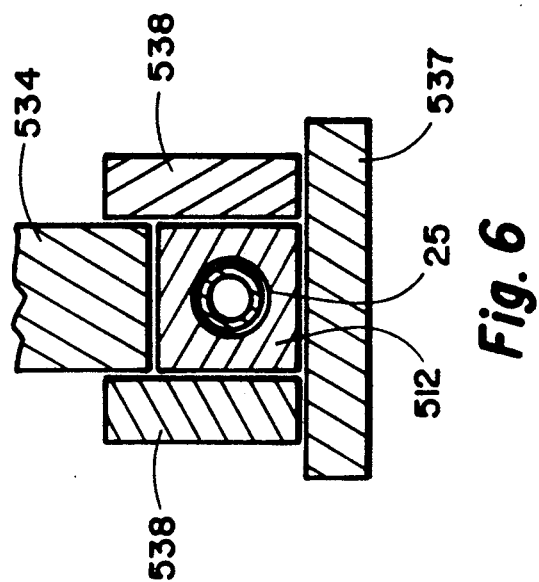
FIG. 6 is an end view illustrating the configuration of a wave guide passage for formation of a typical tubular thermoplastic structure.

All of the above embodiments may be adapted to produce thermoplastic structures of tubular cross-section. To accomplish this, a mandrel will be extended from the preheat section 20 to the wave guide section 30. FIG. 6 is an end view of a mandrel 25 disposed in a platen embodiment of the wave guide section 30. In this configuration, a wave guide 534 is spaced above the platen 537. For illustration purposes the selected tubular thermoplastic structure has exterior walls of square cross-section and an interior wall of circular cross-section. Therefore, the members 538 fixed to the platen 537 are selected to cooperate with the platen 537 and the wave guide 534 to define a square passage substantially the same as the desired exterior walls of the thermoplastic structure 512. The mandrel 25 is selected to have a cross-section substantially the same as the circular cross-section of the interior wall of the desired structure 512. In operation, as the preheated substructures are drawn from the preheat section 20 of FIG. 1 they surround the mandrel 25 which extends into the passage defined by the wave guide 534, the platen 537 and the members 538. The remainder of the process is similar to that hereinbefore described with respect to FIG. 2.

Tubular members may also be formed using the tapered aperture embodiments of the wave guide section 30 in which the selected mandrel extends into the aperture in the wave guide. Thus, it can be seen the thermoplastic structural members of virtually any tubular cross-section can be achieved by the appropriate selection of passage or aperture cross-section and mandrel cross-section.

In any of the above embodiments, with or without use of a mandrel, if greater control of transient changes in temperature is desired, the platen 237 and/or the wave guides 234, 334 and 434 may also be heated to a temperature below the melting point of the resin in the substructures, preferably to a temperature equal to or below the temperature to which the substructures were heated in the preheat section 20. Also, the mandrel may be vibrated to facilitate pulling of the substructure through the wave guide section.

In any of these embodiments, the transducer in the wave guide section 30 will be energized by a power supply through an impedance matching network 90. The transducer may be any known transducer of the piezoelectric or magnetorestrictive type. The Branson Model 102 transducer powered by an ENI EGR-800 power generator having a variable frequency of 9 to 110 kHz and an output power of 0 to 800 watts in conjunction with an ENI EVB-1 impedance matching network has worked effectively.

The pultrusion process for thermoplastics has been found to operate most effectively at ultrasonic frequencies in the range of 10 to 100 kHz and especially in the range of 15 to 50 kHz. It is desirable that the ultrasonic wave guide be powered at 25 to 500 watts and preferably in the range of 50 to 300 watts. The actual power is determinable as a function of the contact area of the wave guide with the surface of the heated substructures.

Figure 7:
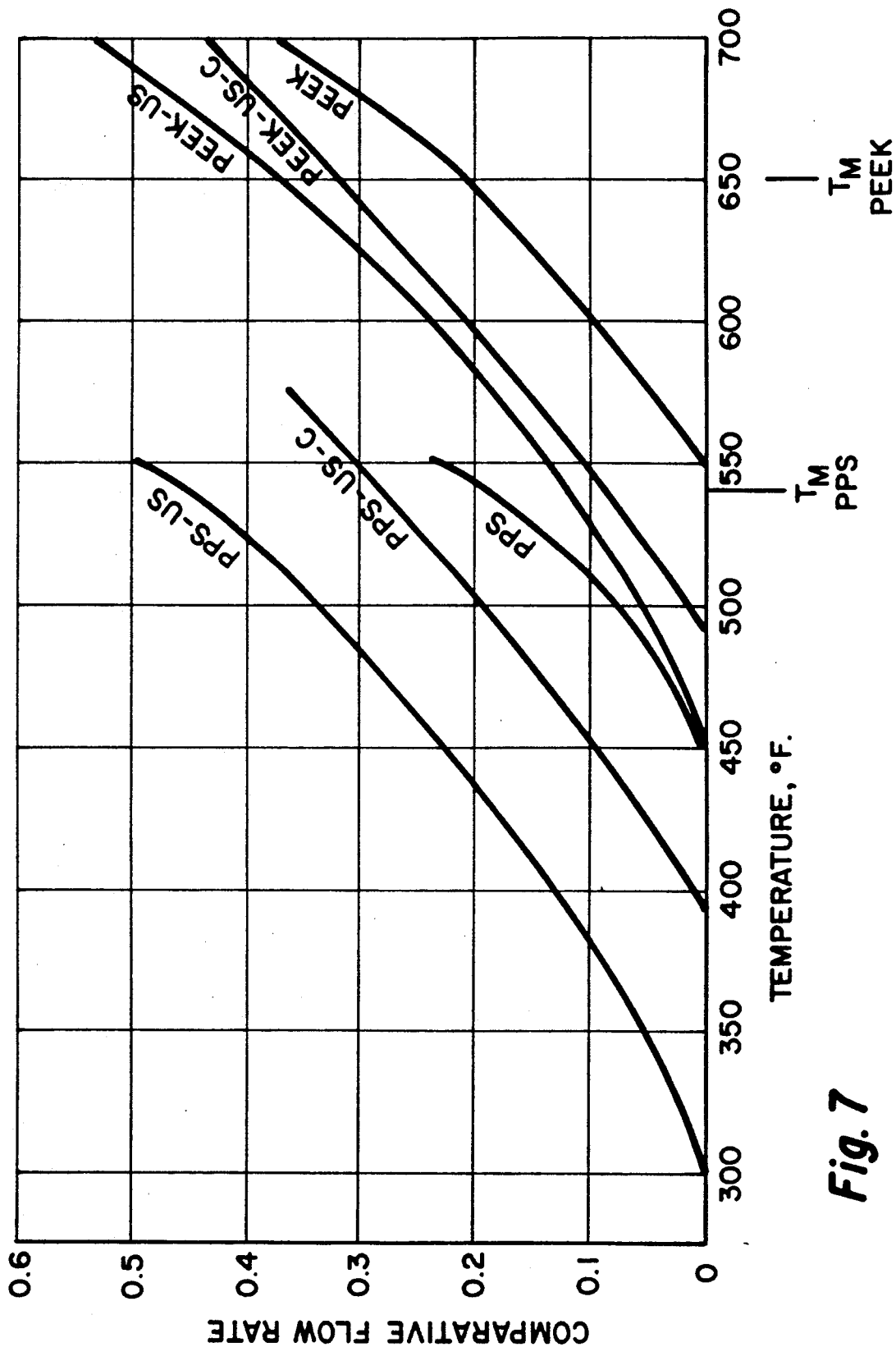
FIG. 7 is a graphic representation of the below-melt-temperature principal of the present invention.

The pultrusion process for thermoplastic structures works effectively with graphite, glass and KEVLAR fibers, but is not limited to these fibers. It also works effectively with a variety of resins such as polyphenylene sulfide, polyetheretherketone, polypropylene or polyetherimide, but is not limited to such resins. The effectiveness of the process with polyphenylene sulfide (PPS) or polyetheretherketone (PEEK) resins is illustrated in FIG. 7. Given a constant pressure of 300 psi, the change in flow rate of polyphenylene sulfide samples under changing temperature conditions without the application of ultrasonic vibration is illustrated by the curve PPS while the change in flow rate under changing temperature conditions accompanied by ultrasonic vibration is illustrated by the curve PPS-US. For polyetheretherketone, the flow rate without ultrasonic vibration is illustrated by the curve PEEK and with ultrasonic vibration is illustrated as the curve PEEK-US. It will be noted that, with the use of ultrasound, the flow of polyphenylene sulfide is stimulated at temperatures below its melt temperature of 545° F. and the flow of polyetheretherketone is stimulated at a temperature below its melt temperature of 650° F. degrees. Adjustment of the ultrasonic curves PPS-US and PEEK-US to account for increasing temperature in the resin due to the ultrasonic vibration is illustrated by the curves PPS-US-C and PEEK-US-C. It will be noted that the increase in flow rates of the resin illustrated by the ultrasonic curves PPS-US and PEEK-US is substantially greater than can be accounted for by the adjustment for temperature made in the corrected ultrasonic curves PPS-US-C and PEEK-US-C.

Thus, it is apparent that there has been provided, in accordance with the invention, a process and apparatus that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. Apparatus for producing a fiber reinforced thermoplastic structure of predetermined cross-section from a plurality of resin impregnated, fiber substructures comprising:
   means for heating said substructures to a temperature just below the melting temperature of said resin;
   a platen in a downstream relationship relative to said heating means;
   a wave guide spaced apart from said platen;
   means mounted on said platen and cooperable with said platen and said wave guide to define a passage having said predetermined cross-section;
   means in a downstream relationship relative to said passage for pulling said heated substructures from said heating means through said passage;
   means coupled to said waveguide for vibrating said wave guide at an ultrasonic frequency and in a direction normal to the movement of said substructures through said passage to cause said resin of said substructures within said passage to flow; and
   means coupled to said waveguide for pressing said waveguide toward said platen to consolidate said substructures into an integral structure.

2. Apparatus according to claim 1 further comprising means coupled to said waveguide for heating said waveguide to a temperature equal to or just below the temperature of said heated substructures.

3. Apparatus according to claim 1 further comprising:
means interposed between said waveguide and said pulling means for cooling said consolidated integral structure to a temperature less than the glass transition temperature of said resin in said substructures; and
means in a downstream relationship relative to said pulling means for cutting said integral structure into predetermined lengths.

4. Apparatus for producing a fiber reinforced thermoplastic structure of predetermined cross-section from a plurality of resin impregnated, fiber substructures comprising:
means for heating said substructures to a temperature just below the melting temperature of said resin;
a platen in a downstream relationship relative to said heating means;
a wave guide spaced apart from said platen;
means coupled to said waveguide for heating said waveguide to a temperature equal to or just below the temperature of said heated substructures;
means mounted on said platen and cooperable with said platen and said wave guide to define a passage having said predetermined cross-section;
means in a downstream relationship relative to said passage for pulling said heated substructures from said heating means through said passage to conform said substructures to said predetermined cross-section;
means coupled to said waveguide for vibrating said wave guide at an ultrasonic frequency and in a direction normal to the movement of said substructures through said passage to cause said resin of said substructures within said passage to flow;
means coupled to said waveguide for pressing said waveguide toward said platen to consolidate said substructures into an integral structure;
means interposed between said pressing means and said pulling means for cooling said consolidated integral structure to a temperature less than the glass transition temperature of said resin in said substructures; and
means in a downstream relationship relative to said pulling means for cutting said integral structure into predetermined lengths.

5. Apparatus for producing a tubular fiber reinforced thermoplastic structure of predetermined hollow cross-section from a plurality of resin impregnated, fiber substructures comprising:
means for heating said substructures to a temperature just below the melting temperature of said resin;
a platen in a downstream relationship relative to said heating means;
a wave guide spaced apart from said platen;
means mounted on said platen and cooperable with said platen and said wave guide to define a passage of cross-section substantially the same as that of the exterior wall of said structure;
a mandrel of cross-section substantially the same as that of the interior wall of said structure axially disposed within said passage;
means in a downstream relationship relative to said passage for pulling said heated substructures from said heating means through said passage to conform said substructures to said predetermined hollow cross-section;
means coupled to said waveguide for vibrating said wave guide at an ultrasonic frequency and in a direction normal to the movement of said substructures through said passage to cause said resin of said substructures within said passage to flow; and
means coupled to said waveguide for pressing said waveguide toward said platen to consolidate said substructures into an integral structure.

6. Apparatus according to claim 5 further comprising means coupled to said waveguide for heating said waveguide to a temperature equal to or just below the temperature of said heated substructures.

7. Apparatus according to claim 5 further comprising:
means interposed between said waveguide and said pulling means for cooling said consolidated integral structure to a temperature less than the glass transition temperature of said resin in said substructures; and
means in a downstream relationship relative to said pulling means for cutting said integral structure into predetermined lengths.

8. Apparatus according to any one of claims 1, 4 or 5 further comprising means coupled to said platen for heating said platen to a temperature equal to or just below the temperature of said heated structures.

9. Apparatus according to claim 5 further comprising means coupled to said mandrel for vibrating said mandrel for vibrating said mandrel at an ultra sonic frequency in the range of 10 to 100 kHz in a direction parallel to the axis of said aperture.

10. Apparatus for producing a tubular fiber reinforced thermoplastic structure of predetermined hollow cross-section from a plurality of resin impregnated, fiber substructures comprising:
means for heating said substructures to a temperature just below the melting temperature of said resin;
a platen in a downstream relationship relative to said heating means;
a wave guide spaced apart form said platen;
means coupled to said waveguide for heating said waveguide to a temperature equal to or less than the temperature of said heated resin;
means mounted on said platen and cooperable with said platen and said wave guide to define a passage of cross-section substantially the same as that of the exterior wall of said structure;
a mandrel of cross-section substantially the same as that of the interior wall of said structure axially disposed within said passage;
means in a downstream relationship relative to said passage for pulling said heated substructures from said heating means through said passage to conform said substructures to said predetermined hollow cross-section;
means coupled to said waveguide for vibrating said wave guide at an ultrasonic frequency and in a direction normal to the movement of said substructures through said passage to cause said resin of said substructures within said passage to flow; and
means coupled to said waveguide for pressing said waveguide toward said platen to consolidate said substructures into an integral structure.
means interposed between said waveguide and said pulling means for cooling said integral structure to a temperature less than the glass transition temperature of the resin in the substructures; and
means in a downstream relationship relative to said pulling means for cutting said cooled structure into predetermined length.

11. Apparatus according to claim 10 further comprising means coupled to said platen for heating said platen to a temperature just less than or equal to the temperature of said heated substructures.

* * * * *